US011995815B2

(12) United States Patent
Peters et al.

(10) Patent No.: US 11,995,815 B2
(45) Date of Patent: May 28, 2024

(54) METHOD AND DEVICE FOR INSPECTING HARD-TO-REACH COMPONENTS

(71) Applicant: Lufthansa Technik AG, Hamburg (DE)

(72) Inventors: Jan Oke Peters, Hamburg (DE); Michael Thies, Hamburg (DE); Thorsten Schueppstuhl, Hamburg (DE); Werner Neddermeyer, Echternach (LU); Sven Rasche, Hamburg (DE); Tomas Domaschke, Hamburg (DE); Maik Dammann, Hamburg (DE); Mattes Schumann, Hamburg (DE); Jens-Peter Tuppatsch, Hamburg (DE); Soenke Bahr, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 414 days.

(21) Appl. No.: 17/422,215

(22) PCT Filed: Dec. 12, 2019

(86) PCT No.: PCT/EP2019/084899
§ 371 (c)(1),
(2) Date: Jul. 12, 2021

(87) PCT Pub. No.: WO2020/148036
PCT Pub. Date: Jul. 23, 2020

(65) Prior Publication Data
US 2022/0084178 A1    Mar. 17, 2022

(30) Foreign Application Priority Data

Jan. 14, 2019 (DE) ..................... 10 2019 100 820.4

(51) Int. Cl.
*G06T 15/04* (2011.01)
*G01N 21/954* (2006.01)
(Continued)

(52) U.S. Cl.
CPC .......... *G06T 7/001* (2013.01); *G01N 21/954* (2013.01); *G06T 7/75* (2017.01); *G06T 15/04* (2013.01);
(Continued)

(58) Field of Classification Search
CPC .......... G06T 7/001; G06T 7/75; G06T 15/04; G06T 2207/10068; G06T 2207/30164;
(Continued)

(56) References Cited

U.S. PATENT DOCUMENTS

2012/0154594 A1    6/2012  Xie et al.
2013/0010070 A1    1/2013  Tateno et al.
(Continued)

FOREIGN PATENT DOCUMENTS

CN    102914293 A    2/2013
CN    103356155 A    10/2013
(Continued)

OTHER PUBLICATIONS

Steffen Matthias, et al., "A 3D measuring endoscope for hand-guided operation", Measurement Science and Technology 29, Aug. 1, 2018, pp. 1-12, IOP Publishing Ltd, United States.

*Primary Examiner* — Chuong A Ngo
(74) *Attorney, Agent, or Firm* — LEYDIG, VOIT & MAYER, LTD.

(57) ABSTRACT

A method uses a flexible endoscope to inspect one or more hard-to-reach components of a gas turbine. The flexible endoscope has at least one image capture unit, which is configured to capture visual image information and associated 3D data, and which is located at a free end of the (Continued)

flexible endoscope. The method includes: introducing the flexible endoscope through an inspection opening; capturing the visual image information and the associated 3D data by the at least one image capture unit; comparing the captured 3D data to a 3D model of a component to be examined, and based on the comparison, ascertaining a relative pose of the at least one image capture unit in relation to the component; and texturing the 3D model with the visual image information captured by the at least one image capture unit, in accordance with the ascertained relative pose of the image capture unit.

9 Claims, 3 Drawing Sheets

(51) Int. Cl.
    *G06T 7/00*         (2017.01)
    *G06T 7/73*         (2017.01)

(52) U.S. Cl.
    CPC ............... *G06T 2207/10068* (2013.01); *G06T 2207/30164* (2013.01)

(58) Field of Classification Search
    CPC . G06T 2207/10012; G06T 2207/10028; G06T 2207/30244; G06T 2215/16; G01N 21/954; G01N 2021/9542; G02B 23/2492; G02B 23/2415; G02B 23/2423; F05B 2260/80; F05D 2260/80; F05D 2270/8041; F01D 21/003; G01M 11/081; G01M 15/14

See application file for complete search history.

(56) References Cited

U.S. PATENT DOCUMENTS

| | | |
|---|---|---|
| 2013/0207965 A1 | 8/2013 | Hori |
| 2014/0185912 A1 | 7/2014 | Lim et al. |
| 2015/0012171 A1 | 1/2015 | Richter et al. |
| 2020/0175719 A1* | 6/2020 | Wright ..................... G06T 5/20 |
| 2023/0012778 A1 | 1/2023 | Mintz et al. |

FOREIGN PATENT DOCUMENTS

| | | |
|---|---|---|
| DE | 102011087357 A1 | 5/2013 |
| DE | 102013206911 A1 | 10/2014 |
| DE | 202015009460 U1 | 10/2017 |
| EP | 3264341 A1 | 1/2018 |
| JP | 2003187223 A | 7/2003 |
| JP | 2018532467 A | 11/2018 |
| WO | 03039820 A1 | 5/2003 |

* cited by examiner

METHOD AND DEVICE FOR INSPECTING HARD-TO-REACH COMPONENTS

CROSS REFERENCE TO RELATED APPLICATIONS

This application is a U.S. National Phase application under 35 U.S.C. § 371 of International Application No. PCT/EP2019/084899, filed on Dec. 12, 2019, and claims benefit to German Patent Application No. DE 10 2019 100 820.4, filed on Jan. 14, 2019. The International Application was published in German on Jul. 23, 2020 as WO 2020/148036 A1 under PCT Article 21(2).

FIELD

The invention relates to a method and an apparatus for inspecting hard-to-reach components of a gas turbine, in particular of an aircraft engine.

BACKGROUND

The optical inspection of gas turbines, in particular aircraft engines such as jet engines, may use a borescope or an endoscope that can be inserted through a lateral opening into a fully assembled gas turbine in order then to be able to optically inspect the interior of the gas turbine therewith.

By way of example, for the purposes of inspecting the combustion chamber of a gas turbine, a flexible endoscope is inserted and manually moved under constant capture of images until the combustion chamber has been recorded in full, i.e., until at least one image has been captured for each region of the combustion chamber. Thus, a flexible endoscope is frequently guided along the entire internal circumference of a combustion chamber before it is subsequently pulled out slowly. This should ensure that the combustion chamber is diagnostically examined over its entire circumference.

The video recordings generated thus are analyzed manually in order to document the build state of the combustion chamber. In the case of significant damage, there can be a manual static 3D capture in order to analyze the damage to the combustion chamber in even greater detail. However, this 3D capture is very complicated and time-consuming, and so it is only carried out in exceptional circumstances.

The video recordings generated according to the prior art are furthermore practically non-reproducible on account of the manual guidance of the endoscope. Consequently, neither two video recordings of the same gas turbine at different times nor video recordings of two gas turbines of the same type can be directly compared to one another.

SUMMARY

In an embodiment, the present disclosure provides a method that uses a flexible endoscope to inspect one or more hard-to-reach components of a gas turbine. The flexible endoscope has at least one image capture unit, which is configured to capture visual image information and associated 3D data, and which is located at a free end of the flexible endoscope. The method includes: introducing the flexible endoscope through an inspection opening; capturing the visual image information and the associated 3D data by the at least one image capture unit; comparing the captured 3D data to a 3D model of a component to be examined, and based on the comparison, ascertaining a relative pose of the at least one image capture unit in relation to the component; and texturing the 3D model with the visual image information captured by the at least one image capture unit, in accordance with the ascertained relative pose of the image capture unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
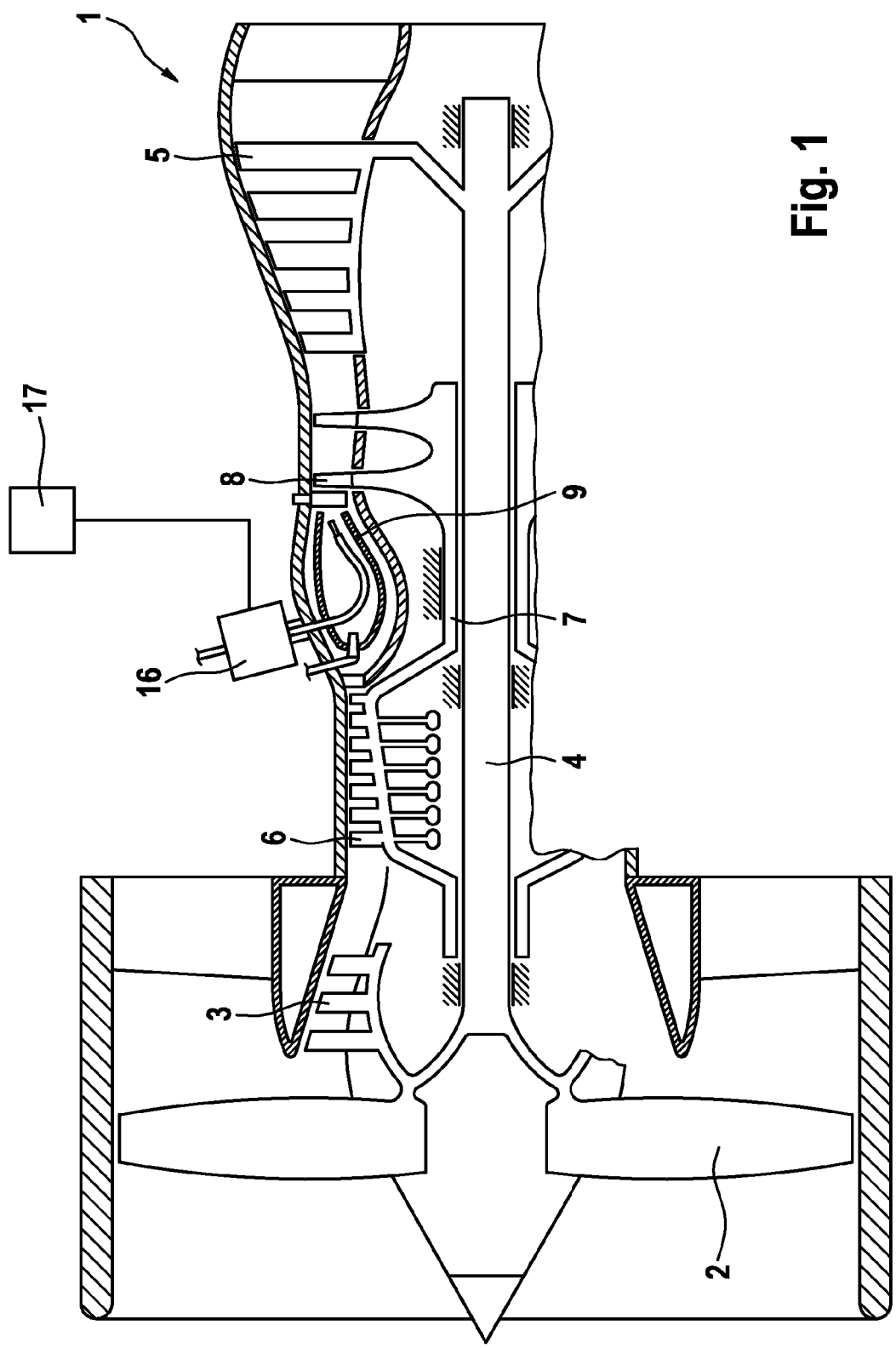
FIG. 1 shows a schematic sectional view of an aircraft engine with an apparatus according to an embodiment the invention inserted therein.

Embodiments of the present invention provide a method and an apparatus for inspecting hard-to-reach components of a gas turbine, in which the disadvantages known from the prior art no longer occur or at least only occur to reduced extent.

Accordingly, Embodiments of the present invention provide a method for inspecting one or more hard-to-reach components of a gas turbine using a controllable flexible endoscope comprising at least one image capture unit which is embodied to capture visual image information and associated 3D data and which is located at the free end of the endoscope, including the steps of:

introducing the endoscope through an inspection opening;

capturing visual image information and 3D data by the image capture unit;

comparing the captured 3D data to a 3D model of the component(s) to be examined, for the purposes of ascertaining the relative pose of the image capture unit in relation to the component or components; and texturing the 3D model with the visual image information captured by the image capture unit, in accordance with the ascertained relative pose of the image capture unit.

Furthermore, embodiments of the present invention provide an apparatus for inspecting one or more hard-to-reach components of a gas turbine, comprising a flexible endoscope with at least one image capture unit, which is embodied to capture visual image information and associated 3D data, at the free end of the endoscope and a computer unit which is connected to the image capture unit and which has a memory for recording a 3D model of the component(s) to be examined, wherein the computer unit is embodied to carry out the method according to an embodiment of the invention.

In the method according to and embodiment of the invention—unlike in the prior art—the image capture unit captures not only visual image information, but also associated 3D data following the insertion of the endoscope through an inspection opening provided to this end. The 3D data are relative position data which reflect the distance of the individual points of the visual image information from the image capture unit, and so a three-dimensional image is ultimately obtained when merging the 3D data with the visual image information.

The captured 3D data are subsequently compared to a 3D model of the component(s) to be examined in order thereby to ascertain the relative pose of the image capture unit in relation to the component captured thereby. By way of example, the 3D model can be the CAD model which formed the basis for the construction of the component(s) to be examined. In this case, the "relative pose" comprises at least the relative position and orientation of the image capture unit in relation to the component(s). Methods for comparing 3D data, available as point clouds or heightmap information as a rule, with 3D models, such as, e.g., wireframe models, in order to ascertain the desired pose are known from the prior art.

The 3D model can then be textured using the visual image information with knowledge of the relative pose of the image capture unit. In the process, the visual information is virtually projected onto the 3D model proceeding from the ascertained pose of the image capture unit and adopted in the 3D model.

It is preferable for the steps of capturing visual image information and associated 3D data, of ascertaining the relative pose of the image capture unit in relation to the component or components by comparing the captured 3D data to a 3D model and of texturing the 3D model using the visual image information captured by the image capture unit to be repeated after the pose of the image capture unit has changed. A change in the pose of the image capture unit also means a change in the image section recorded thereby. By way of an appropriate number of repetitions of the aforementioned steps, the entire 3D model can in this way be successively textured in full in the case of a suitable change in the pose of the image capture unit. If captured visual image information overlaps with already available texture of the 3D model, the items of visual image information can be linked to one another using known stitching methods, as are known from, e.g., panoramic photography.

Particularly in the case of the endoscopic inspection of gas turbines with a rotationally symmetric configuration in principle, it is not possible to preclude the case where no unique pose can be ascertained for the captured 3D data, but instead a plurality of poses of the image capture unit in the 3D model can come into question for the 3D data as a matter of principle.

It is therefore preferable—if new visual image information and 3D data are captured and processed as described following a change in the pose of the image capture unit—for the pose associated with the previously captured visual image information to be used as a starting point for the comparison of 3D data, which was subsequently captured together with further visual image information, with the 3D model of the component(s) to be examined. Expressed differently, the surroundings of the previously ascertained pose should first be examined on the basis of the captured 3D data for relative poses of the image capture unit that may possibly come into question so that if a plurality of poses possibly come into question then the pose coming closest to the previous pose is considered to be applicable. Particularly if the visual image information and 3D data are captured in the case of small changes in the pose of the image capture unit or else captured at regular short intervals, if not even captured continuously, then the pose of the image capture unit can be reliably determined as a rule. If need be, capturing by the image capture unit can already be started during the insertion of the endoscope through the inspection opening such that the described update of the ascertained pose of the image capture unit starts at a defined point which, for example, may also be accordingly stored in the 3D model.

The flexible endoscope can have a manually or automatically controllable kinematic system in order to move the image capture unit which is arranged at the free end through the inspection opening. By way of example, the kinematic system can be configured in accordance with a flexible manipulator arm as a guide for the endoscope, said manipulator arm having a very high number of degrees of freedom. However, the kinematic system may also consist in a chain-like guide of the endoscope, wherein the individual chain members can be moved (in particular pivoted) relative to one another. By way of example, a corresponding guide can also be embodied as a gooseneck made out of a coiled metal tube or structures that are deformable in a similar manner. It is particularly preferable if the endoscope has an angling unit at its free end, by means of which the region equipped with the image capture unit can be angled in relation to the longitudinal axis of the endoscope. The ultimate movement of the kinematic system can be attained in a known manner by way of small actuator elements arranged directly on the guide or by way of Bowden cables. The endoscope can be coated with a plastic to avoid damage to the aircraft engine in the case of inadvertent contact.

In the case of a corresponding manually or automatically controllable kinematic system, the pose of the image capture unit can be determined on account of the state of the kinematic system proceeding from the inspection opening. As a rule, the pose can only be ascertained approximately in the process, i.e., not accurately enough for the direct use as relative pose of the image capture unit for texturing purposes. However, this approximate pose can be used as starting point for the comparison of the captured 3D data to the 3D model of the component(s) to be examined. If a plurality of poses of the image capture unit in the 3D model are conceivable in principle on account of the 3D data, the closest possible pose as per the 3D model can be sought after, proceeding from the captured approximate pose of the image capture unit.

To increase the accuracy of the relative pose to be ascertained or possibly the unambiguity of the ascertained relative pose, it is preferable for the endoscope to comprise at least two image capture units, which capture visual image information and 3D data from different viewing angles, with image information and 3D data from different viewing angles, preferably captured simultaneously, being used together for the comparison of the captured 3D data with the 3D model of the component(s) to be examined. Here, "viewing angle" denotes the angle of the recording cone of the image capture unit in relation to a reference axis or plane, for example the longitudinal axis of the endoscope in the region of the image capture unit or a plane comprising this longitudinal axis. In this case, the viewing angles should be chosen in such a way that no two image capture units capture a completely identical region; however, overlaps, even extensive overlaps, of capture regions of two image capture units are possible. By virtue of providing more than one image capture unit, a larger capture region when capturing visual image information and associated 3D data can be covered on account of the envisaged different viewing angles of the individual image capture units. As a consequence, more 3D data which can be used in the comparison with the 3D model are available. Moreover, greater areas of the 3D model can be textured by means of the additional visual image information of the further image capture sensors in one pass such that, possibly, the number of poses of the image capture unit, of which visual image information and 3D data have to be captured and which are required to completely capture component(s) or desired regions thereof, and also the time associated therewith are able to be reduced.

Provision can be made for a plurality of image capture sensors to be provided and for these to be arranged such that visual image information and 3D data are captured over the entire circumference around the axis of the endoscope in the region of the image capture units. Expressed differently, a sufficient number of image capture units to facilitate 360° recordings should be provided. After the 3D data were used to ascertain the relative pose of the image capture unit in the 3D model, the 3D data are preferably used for another comparison with the 3D model for the purposes of determining deviations. When ascertaining the pose of the image capture unit on the basis of the 3D data, deviations from the 3D model already occur as a matter of principle on account of measurement inaccuracies, said deviations being weighted in order nevertheless to be able to determine the pose of the image capture unit accurately. Deformations or comparable damage to the components to be examined are also reflected in the 3D data and mean a deviation from the 3D model but do not prevent an accurate determination of the pose of the image capture unit by way of suitable weighting in the case of sufficient 3D data from undamaged regions. The deviations ascertained during the "second" comparison of the 3D data with the 3D model can provide information about possible damage to the inspected component(s). The deviations can preferably be stored as modification to the texture (e.g., coloring) and/or as an adjustment of the 3D model in accordance with the captured 3D data. As a result, the determined deviations are easily identified on the textured 3D model.

Provided the kinematic system of the endoscope is automatically controllable, it is preferable for the at least one image capture unit of the endoscope to be automatically guided along a predefined guidance line. By way of example, the guidance line may be contained in the 3D model and/or may be developed on the basis of the 3D model. If automatic guidance of the endoscope is provided, the endoscope or a holder connected therewith merely needs to be placed against the inspection opening and fastened in this region; the ultimate movement of the endoscope in the interior is implemented automatically or under computer control. In the process, the image capture unit is moved along a specified guidance line. What can be ensured by such an automatic guidance of the endoscope in comparison with a manual actuation of the endoscope is that all desired regions of the component(s) to be examined are captured at least once by the one image capture unit without unnecessary twofold captures arising.

The image capture unit can comprise an image sensor for capturing visual image information and a distance sensor for capturing the 3D data. Corresponding sensors are known in the prior art. Is also possible to merge the two sensors, for example in a photonic mixer detector.

For the capture of visual image information and 3D data, it is preferable for the image capture unit to comprise spaced apart image capture sensors with recording axes that are aligned substantially parallel or at a small angle to one another, 3D data being able to be ascertained from the captured image information thereof by way of triangulation. Various calculation processes for obtaining 3D data from two correspondingly captured images are known under the term "computer stereo vision".

To capture visual image information suitable for processing into 3D data, the image capture device can comprise grayscale CMOS sensors with a global shutter, which are sufficiently compact for the use in an endoscope for the required resolution. For color information, provision can be made of an additional color CMOS sensor or color CCD sensor, for which a rolling shutter is sufficient, and so this sensor can also be sufficiently small.

The textured 3D model of the components to be examined created by the method according to an embodiment of the invention can be visualized and assessed as desired on a display device. Moreover, the 3D model generated according to the invention is decoupled from the actual implementation of the endoscopic inspection, and so two 3D models of the same component(s) which were generated at different times can be compared to one another directly and optionally in automated fashion. The same applies to 3D models of different components of the same type. The 3D models generated can be stored, evaluated, and processed further as desired.

To explain the apparatus according to embodiments the invention, reference is made to the explanations above.

Figure 2:
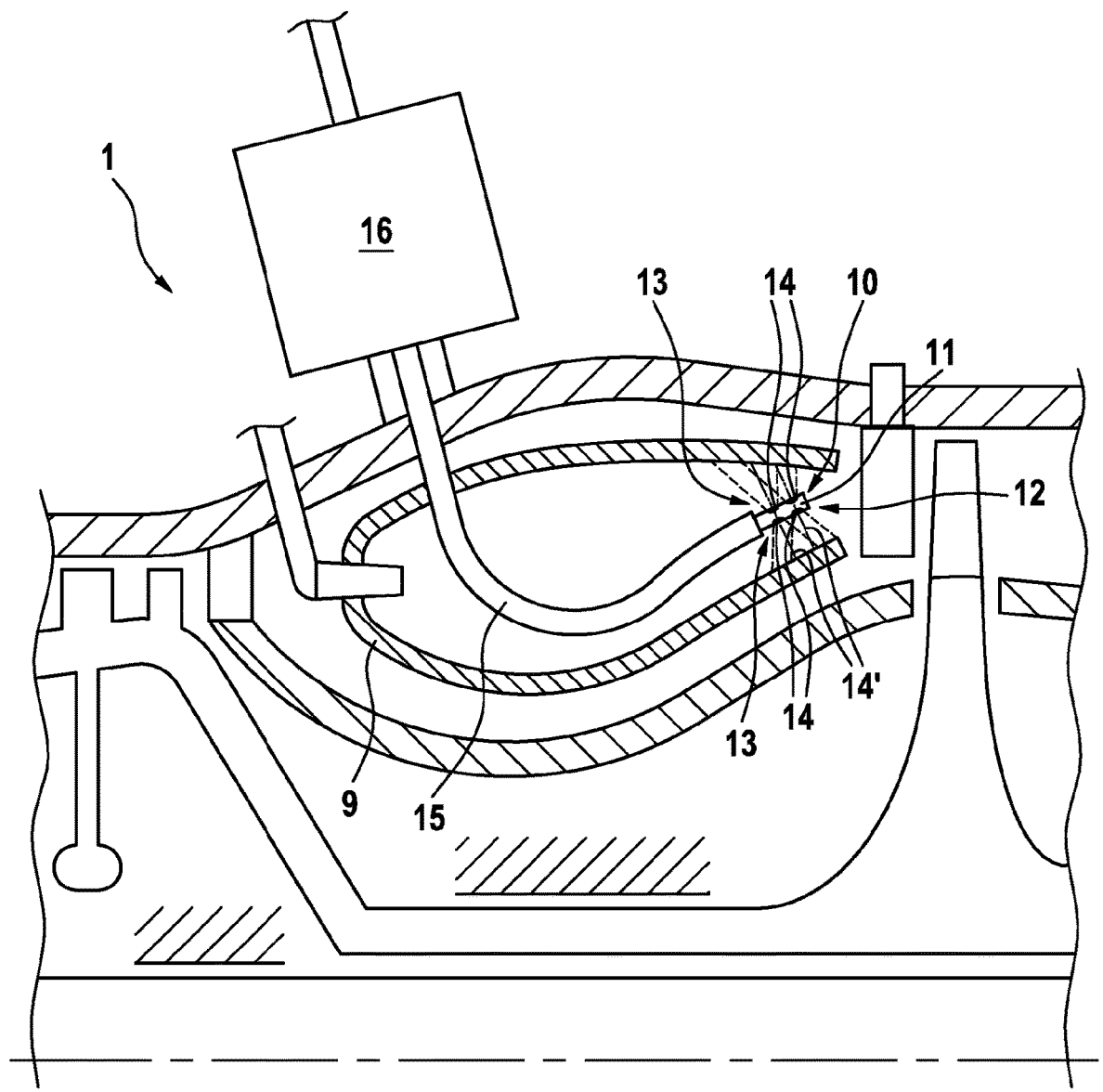
FIG. 2 shows an enlarged excerpt of FIG. 1.

FIGS. 1 and 2 schematically show a section through a two-spool engine 1, in which the fan 2 and the low-pressure compressor 3 is connected so as to co-rotate with the low-pressure turbine 5 by way of a first shaft 4 while the high-pressure compressor 6 is connected so as to co-rotate with the high-pressure turbine 8 by way of a second shaft 7. The combustion chamber 9 is arranged between high-pressure compressor 6 and high-pressure turbine 8.

An apparatus 10 according to an embodiment of the present invention is provided for inspecting the combustion chamber 9.

The apparatus 10 comprises a flexible endoscope 11, at the free end 12 of which two image capture units 13 are provided. Each of the image capture units 13 respectively comprises two image capture sensors 14. The image capture sensors 14 are CMOS sensors with a global shutter. The recording axes 14' of the two image capture sensors 14 of a respective image capture unit 13 extend parallel to one another. As a result, 3D data can be derived from simultaneously recorded image information of the image capture sensors 14 of the same image capture unit 13 by using known computer stereo vision methods. The two image capture units 13 are arranged on opposite sides of the endoscope 11 such that the image capture units 13 each have different viewing angles and each cover different recording regions.

The flexible endoscope 11 has an automatically controllable kinematic system in the form of a controllable guide 15, in which the flexible endoscope 11 is guided. Here, the guide 15 is configured as a flexible manipulator arm which has a very high number of degrees of freedom. The drives and controller of the guide 15 are arranged in the support and drive unit 16. The apparatus 10 is fastened to the outer side of the engine 1 in the region of an inspection opening using the support and drive unit 16. The drives integrated in the unit 16 are embodied to further insert the endoscope 11 or its guide 15 through the inspection opening or pull it out of the latter. Moreover, the drives allow the guide 15 to be controlled in all available degrees of freedom and allow the endoscope 11 to be rotated with respect to the guide 15. By way of the support and drive unit 16, the free end of the endoscope 11 can be positioned and oriented virtually anywhere in the combustion chamber 9, with the approximate pose of the image capture units 13 at the free end 12 of the endoscope 11 in relation to the inspection opening arising from the control of the guide 15 or of the endoscope 11. If the pose of the inspection opening is unique in relation to the combustion chamber 9, this can be used to ascertain the approximate pose of the image capture units 13 in relation to the combustion chamber 9.

The image capture units 13 of the endoscope 11 and the support and drive unit 16 are data-connected to the computer 17. The computer 17 is embodied to control the endoscope 11, in particular by way of the support and drive unit 16, and consequently to move the image capture units 13 in particular. Additionally, the data captured by the image capture units 13 can be evaluated. Here, the image capture units 13 can merely supply the visual image information, which is recorded by the respective image capture sensors 14, to the computer 17, which then ascertains 3D data therefrom with the aid of computer stereo vision methods. However, it is also possible for the image capture units 13 to comprise suitable calculation modules, by means of which the 3D data are ascertained and so it is only still necessary to transmit the visual image information from one of the two image capture sensors 14 to the computer 17, together with the 3D data ascertained in the image capture unit 13 itself.

Figure 3:
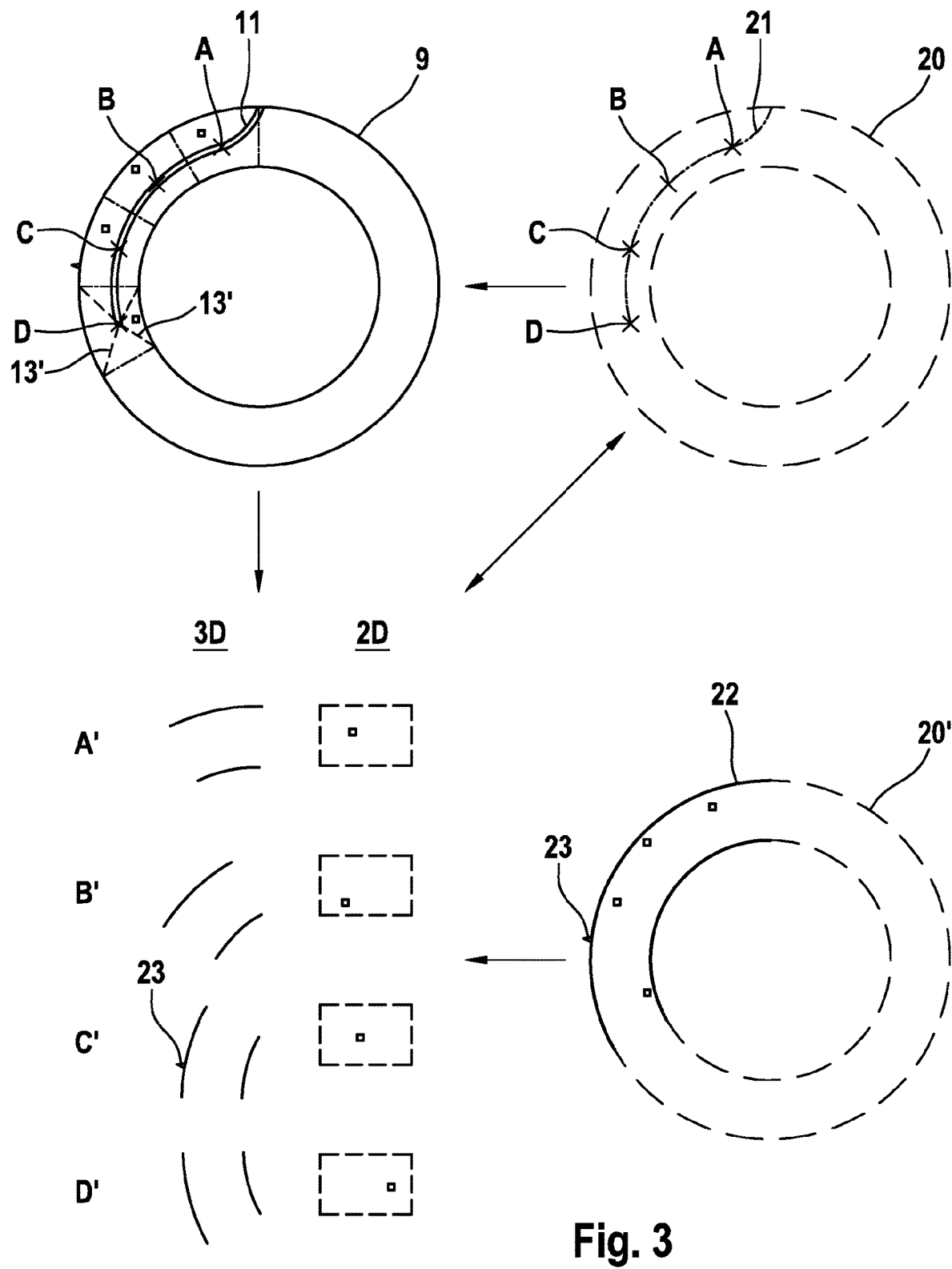
FIG. 3 shows a schematic illustration of the functionality of the apparatus of FIGS. 1 and 2.

The basic functionality of the apparatus 10 from FIGS. 1 and 2 is now explained on the basis of FIG. 3. Here, a simplified illustration is deliberately resorted to for reasons of clarity.

Provided in the computer 14 is a 3D model 20 of the component to be examined—specifically the combustion chamber 9—of which only one section is illustrated for the sake of clarity. In the initial state, the 3D model 20 has no texture, which is why it is illustrated using dashed lines.

A guidance line 21, along which four poses A, B, C, D at which visual image data and 3D data should be captured in each case are defined, is part of the 3D model 20.

The guidance line 21 is used by the computer 14 to guide the endoscope 11 therealong with the aid of the support and drive unit 16 (cf. FIG. 3, top left). Visual 2D image information and 3D data are in each case captured by the image capture units 13—of which only the recording cones 13' are indicated in FIG. 3—when the poses A, B, C, D are reached. In the process, the 3D data are obtained via computer stereo vision methods from the visual 2D image information from the two image capture sensors 14 of an image capture unit 13 (cf. FIG. 2) and consequently reflect the distance of the individual points of the visual image information from the image capture unit 13.

The data from the two image capture units 13 are processed further by the computer 14 together with the respectively specified pose A, B, C, D (cf. FIG. 3, bottom left), from where the visual image information and the 3D information derived therefrom were captured. Since, as a rule, the poses A, B, C, D cannot be accurately attained by the endoscope 11 or its guide 15 with sufficient reliability, the poses in the process can be considered to be not actual poses but only approximate poses A', B', C', D'.

Proceeding from the approximate poses A', B', C', D', the captured 3D data of the two image capture devices 13 are compared to the model 20 and in order to ascertain the actual pose of the two image capture devices 13 and hence of the free end 12 of the endoscope 11. Appropriate methods for comparing the captured 3D data to the 3D model 20 are known from the prior art. By virtue of proceeding from the respective approximate pose A', B', C', D', it is possible to ensure that, following the comparison of 3D data with the 3D model 20, the actual applicable pose is chosen from a plurality of possible poses of the image capture devices 13.

The exact pose of the image capture units 13 ascertained thus is subsequently used to virtually project visual 2D image data from the respectively ascertained actual pose of the image capture units 13 onto the 3D model 20, as a result of which a textured 3D model 20' is generated. Should overlaps between already existing textures 22 and projected 2D image data arise in the process, it is possible to apply stitching methods known from the prior art in order to obtain a seamless transition in the texture.

Moreover, the 3D model 20' can be adjusted on the basis of local deviations 23 therefrom in the captured 3D data, which deviations frequently indicate damage, and so the deviation 23 can also be found in the textured 3D model 20'. Moreover, the texture 20 can be colored in the region of corresponding deviations 23 in order thus to make the deviations 23 more easily identifiable in the 3D model 20'.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for inspecting one or more hard-to-reach components of a gas turbine using a flexible endoscope comprising at least one image capture unit, which is configured to capture visual image information and associated 3D data, and which is located at a free end of the flexible endoscope, the method comprising:
   introducing the flexible endoscope through an inspection opening;
   capturing the visual image information and the associated 3D data by the at least one image capture unit;
   comparing the captured 3D data to a 3D model of a component to be examined, and based on the comparison, ascertaining a relative pose of the at least one image capture unit in relation to the component; and
   texturing the 3D model with the visual image information captured by the at least one image capture unit, in accordance with the ascertained relative pose of the image capture unit,
   wherein the flexible endoscope has an automatically controllable kinematic system, via which an approximate pose of the at least one image capture unit is able to be ascertained, the approximate pose being used as a starting point for the comparison of the captured 3D data with the 3D model of the component to be examined, and wherein the method further comprises automatically guiding the at least one image capture unit along a guidance line obtained in the 3D model.

2. The method as claimed in claim 1, wherein the operations of capturing, comparing, ascertaining, and texturing are repeated following a change in the pose of the at least one image capture unit of the flexible endoscope.

3. The method as claimed in claim 2, wherein the pose associated with a previously captured visual image information is used as a starting point for the comparison of 3D data, which was subsequently captured together with further visual image information, with the 3D model of the component to be examined.

4. The method as claimed in claim 1, wherein the flexible endoscope comprises at least two image capture units, comprising the at least one image capture unit, which capture the visual image information and the 3D data from different viewing angles, wherein the image information and the 3D data from different viewing angles are captured simultaneously, and used together for the comparison of the captured 3D data with the 3D model of the component to be examined.

5. The method as claimed in claim 1, the method comprising comparing the captured 3D data to the 3D model to determine deviations after the pose of the at least one image capture unit has been ascertained in relation to the component.

6. The method as claimed in claim 5, wherein the deviations are stored as a change in the texture or as an adjustment of the 3D model in accordance with the captured 3D data.

7. The method as claimed in claim 1, wherein the at least one image capture unit comprises spaced apart image capture sensors with recording axes that are aligned substantially parallel to one another, 3D data being able to be ascertained from the captured image information thereof by way of triangulation.

8. An apparatus for inspecting one or more hard-to-reach components of a gas turbine, the apparatus comprising:

a flexible endoscope comprising at least one image capture unit, which is configured to capture visual image information and associated 3D data, the at least one image capture unit being at a free end of the flexible endoscope, the flexible endoscope having an automatically controllable kinematic system, via which an approximate pose of the at least one image capture unit is able to be ascertained, the approximate pose being a starting point for a comparison of captured 3D data with a 3D model of the component to be examined; and a computer which is connected to the at least one image capture unit and which has a memory for recording the 3D model of the component to be examined, wherein the computer unit is configured to:

capture the visual image information and the associated 3D data using the at least one image capture unit;

compare the captured 3D data to the 3D model of the component to be examined, and based on the comparison, ascertaining a relative pose of the at least one image capture unit in relation to the component;

texture the 3D model with the visual image information captured using the at least one image capture unit, in accordance with the ascertained relative pose of the image capture unit; and automatically guide the at least one image capture unit along a guidance line obtained in the 3D model.

9. The apparatus as claimed in claim 8, wherein the at least one image capture unit comprises spaced apart image capture sensors with recording axes that are aligned substantially parallel to one another, the 3D data being able to be ascertained from the captured image information thereof by way of triangulation.

\* \* \* \* \*